July 4, 1961 D. W. VAN GIESON 2,990,639

TELEPHONE NUMBER INDEXES

Filed July 10, 1959 2 Sheets-Sheet 1

INVENTOR.
DAVID W. VAN GIESON
BY William Wolfe

INVENTOR.
DAVID W. VAN GIESON
BY William Wolfe

United States Patent Office
2,990,639
Patented July 4, 1961

2,990,639
TELEPHONE NUMBER INDEXES
David W. Van Gieson, 311 Helena Ave., Yonkers, N.Y.
Filed July 10, 1959, Ser. No. 826,186
4 Claims. (Cl. 40—336)

This invention relates to a telephone number listing index, and more specifically to a type designed to rest between the corner supporting feet on the underside of a modern telephone instrument of the cradle handset type.

The invention is an improvement over the telephone number listing index disclosed in my Patent 2,741,860, dated April 17, 1956.

An object is to devise an index of a type which is independent of the telephone instrument so that it will not act as a support therefor, and which index is simply attached by an elastic means, thus avoiding violations of telephone company regulations pertaining to foreign attachments to its rented equipment, and permitting the use of the device under tariffs on file with the Federal Communications Commission.

Another object is to provide a sliding index that will hold its position and operate freely under various types and sizes of modern cradle handset telephone instruments.

Another object is to provide an index of such compact design as to be inconspicuous when in a position largely of concealment under a telephone instrument.

Another object is to provide a type of sliding index which will readily permit a number which is frequently called to be so aligned that it can be quickly sought by the eye during the process of dialing the number.

Another object is to provide a sliding index that will afford protection of the index material against soiling, blurring, effacement, or mutilation through handling.

Another object is to provide a readily accessible index or directory of telephone numbers frequently called, conveniently located with relation to the telephone instrument, wherein, as exemplified in the embodiment to be described, the simplicity and economy of construction is such as to employ only simple sheet stampings.

Another object is to provide a sliding index wherein all rigid members are so connected and interlocked during assembly as to require no other fastening means.

A further object is to provide a sliding index wherein a complement of alphabetically indexed sheets are so secured that they can be quickly and easily removed and securely replaced when making changes in listings.

A still further object is to provide a functional device with exposed advertising display space, the whole being so designed as to make it economically practical for advertising giveaway purposes.

With the above and other objects in view, the invention resides in the novel and economical construction, and the combination and arrangement of parts, as hereinafter described and claimed, it being understood that various modifications of the embodiment disclosed may be made within the scope of the appended claims.

More particularly the invention consists of a frame member designed for lodgement between the corner supporting feet on the underside of a telephone instrument, an elastic means for detachable attachment to the instrument, and a movable member slidably interlocked with the frame member in combination with an overlay member for receiving, holding, exposing, and protecting the indexed material.

Figures 1, 2, 3, 4:
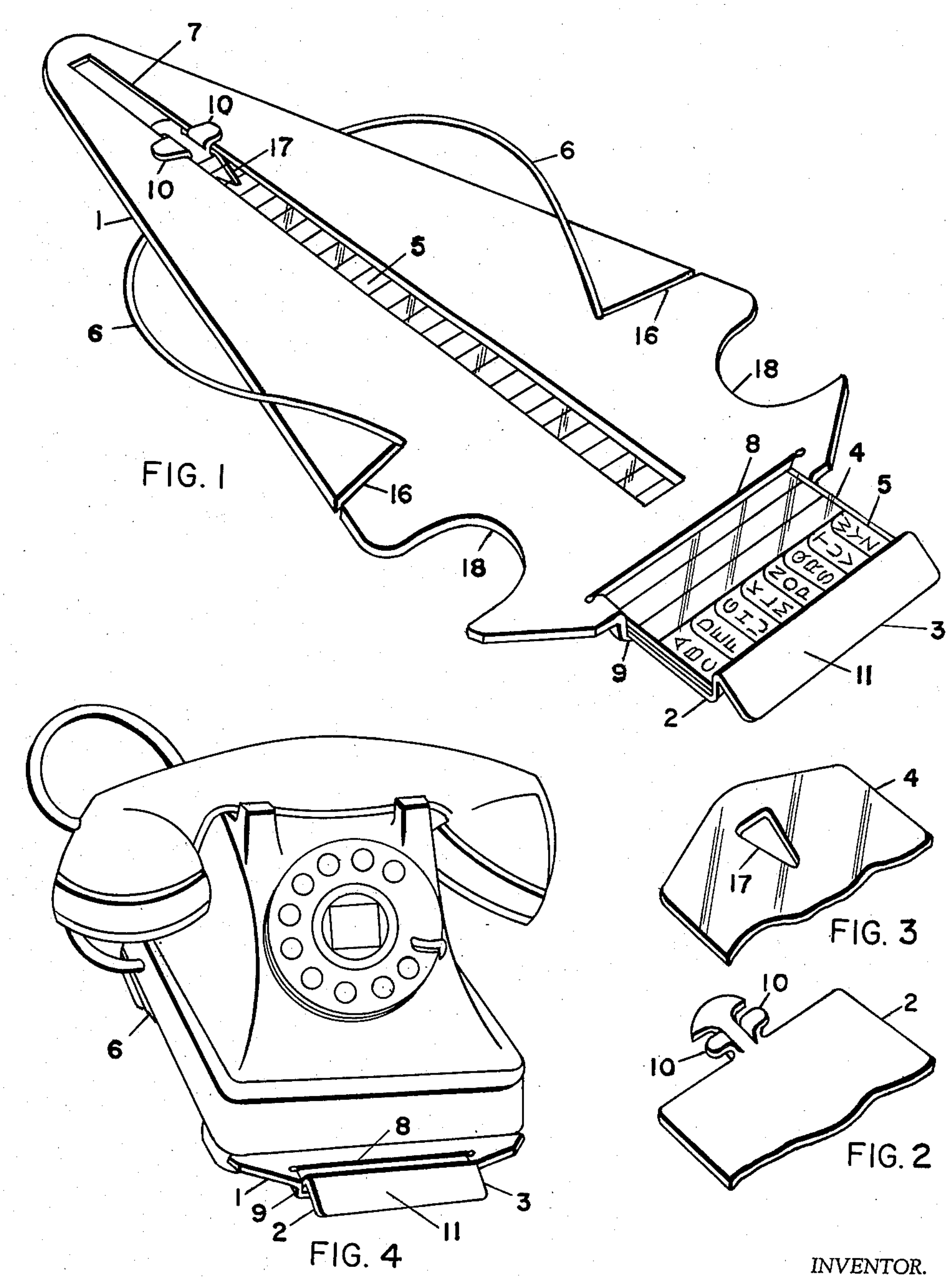
FIG. 1 is a perspective view of the assembled index with slide member, overlay member, and indexed material partially withdrawn from the frame member.
FIG. 2 is a fragmentary perspective view of the rear portion of slide member.
FIG. 3 is a fragmentary perspective view of the rear portion of overlay member.
FIG. 4 is a perspective view of the completely assembled device in place under a telephone instrument, with the movable members in a fully retrieved or closed position.
Figure 5:
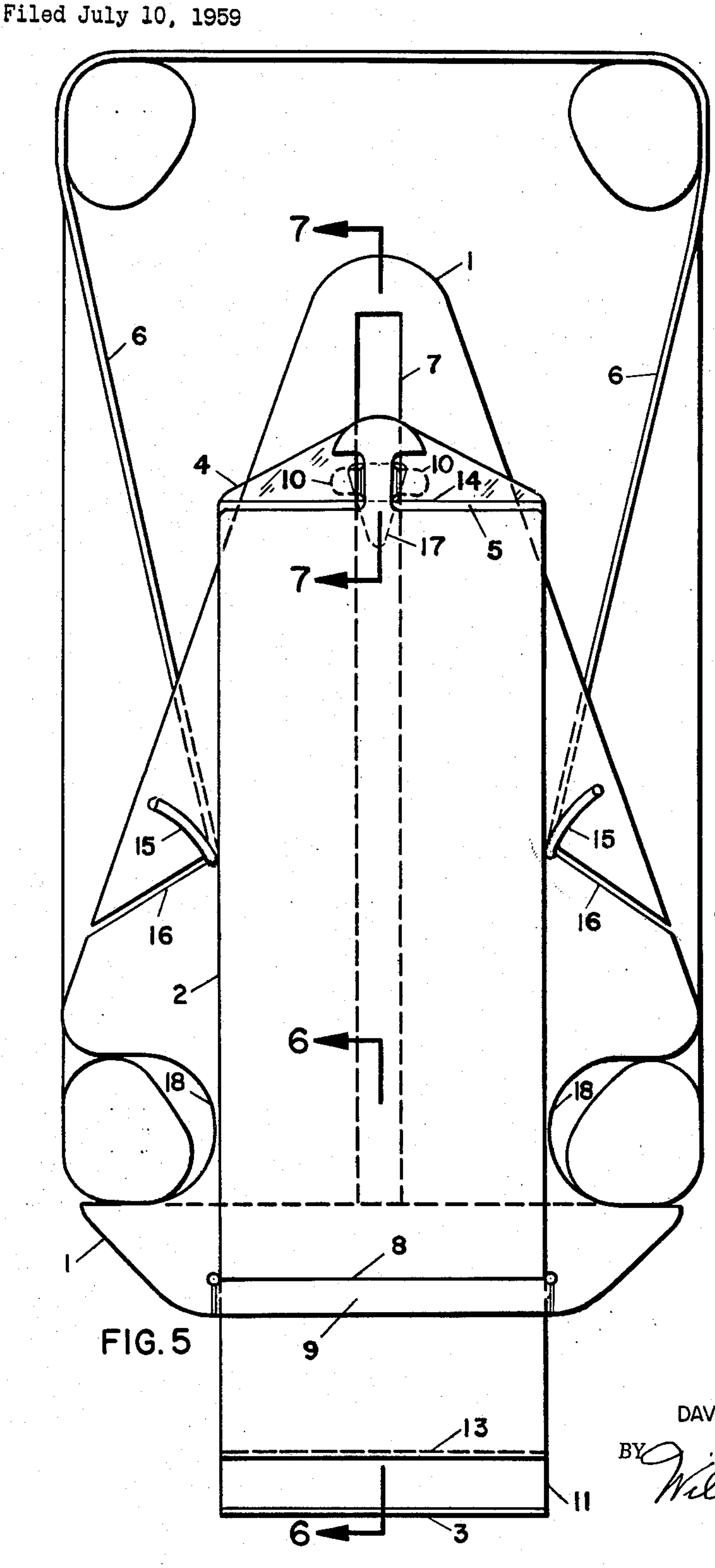
FIG. 5 is plan view of the completely assembled device attached in place under a telephone instrument with the movable members partially withdrawn from the frame member, all as viewed when looking at the underside of the telephone instrument.

Referring now in detail to the accompanying drawings, in which like numerals indicate similar elements, the telephone number listing index is comprised of a frame member, a slide member, an overlay member, index material, and an attachment member. Frame member 1 and slide member 2 can be formed of rigid but light-gage sheet plastic, fiber, or other suitable material, and may be transparent, translucent, or opaqe. Overlay member 4 can be formed of rigid plastic or other suitable material, but must be transparent and of sufficiently light-gage to have the flexibility of ordinary sheet paper. Indexed material 5 may be sheets of light-weight paper, ruled and alphabetically indexed. Attachment member 6 is an elastic cord.

Frame member 1 is provided with a centrally disposed longitudinal slot 7, and a transverse slot 8 at the forward end 3 of the device, these slots functioning to hold and guide slide member 2. Slide member 2 is designed to slip into transverse slot 8 and to rest loosely in the cradle formed by depressed portion 9 of frame member 1. The rear portion of slide member 2 is provided with two tongues 10 designed to lightly engage and lap over separate edges of longitudinal slot 7; they are bent over in such manner as to loosely interlock the two members 1 and 2. Tongues 10 may be bent to their fixed positions before assembly; they are readily received by longitudinal slot 7 by simply flexing and temporarily spreading the slot for such reception.

Figures 6, 7:
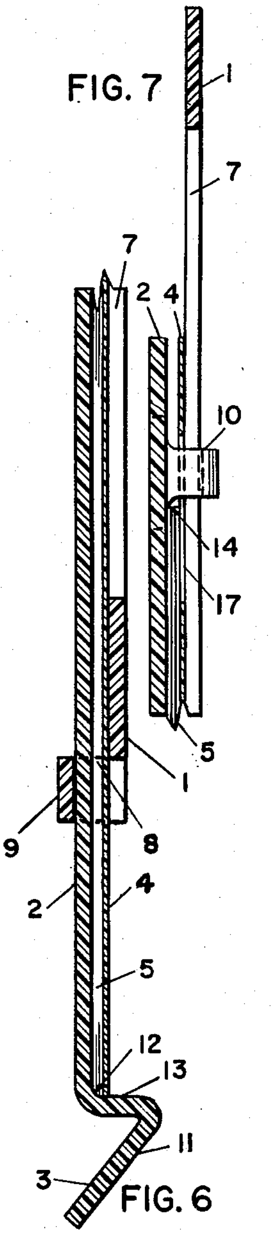
FIG. 6 is an enlarged sectional elevation of the forward portion of the device taken on line 6—6.
FIG. 7 is an enlarged sectional view of the rear portion of the device taken on line 7—7.

The forward or pull-out end 3 of slide member 2 is bent in angular formation, as shown in FIG. 6, to provide the means of finger gripping for manually withdrawing this slide member to an exposed position and restoring it to its normally concealed position under frame member 1. Surface 11 of the angularly bent portion of slide member 2 may be used for the display of advertising matter or other information in the form of direct imprinting, decalcomanias, pressure-sensitive adhesive labels, or other suitable method.

The indexed material 5 consists of ruled and alphabetically indexed paper sheets, except for the topmost sheet which is not so indexed, this sheet being used for listing parties and telephone numbers most frequently called. The alphabetically indexed paper sheets are used for listing the names and telephone numbers of parties less frequently called. All listing sheets are of such size that when assembled to rest face up, and in superposed relation, on top surface of slide member 2, they are held in place on this slide member by reason of the forward ends 12 of the sheets abutting bent surface 13 of slide member 2, and by reason of the rear ends 14 abutting curved edges of tongues 10 of the slide member; they are restrained from lateral movement by protruding ends 15 of elastic cord 6, the cord ends being forced along narrow side slots 16 in frame member 1 to positions of close relationship to the side edges of the indexed material 5. The indexed material is thus held in place without the need for adhesives, clips, or fasteners of any kind.

Overlay member 4 is provided at its rear portion with a centrally disposed opening 17 of triangular shape. This overlay member is attached to slide member 2 by holding it at a right angle to the latter member and by passing tongues 10, one after the other, through triangular opening 17, whereupon overlay member 4 is rotated to a position where it coincides with slide member 2 and indexed material 5.

With slide member 2, indexed material 5, and overlay member 4, assembled in the manner described, the entire assembly, tongue-end first, is slipped through transverse slot 8 and interlocked with frame member 1 by means of tongues 10, as depicted in FIG. 1.

Semi-circular indentations 18, at each corner of forward end of frame member 1, are fitted around the two forward feet of the telephone instrument, and in cooperation with pull of elastic cord 6, which is stretched around the rear feet of the telephone instrument, the completely assembled telephone index is held securely to the telephone. Adjustment of elastic cord tension is obtained by stretching, and temporarily elongating, the elastic cord 6 at its points of contact with narrow side slots 16, thereby permitting a shifting of the cord positions at these points. Elastic cord 6 is of such thickness with relation to the widths of narrow side slots 16, that normally it cannot slip.

The slidable members are moved in unison, their backward and forward movement being limited by the length of longitudinal slot 7. In operation the slidable members may be withdrawn so that the name of a party most frequently called, and the telephone number, are in alignment with transverse slot 8. This operation sets the desired listing of the most frequently called group on the topmost sheet in a position where it can be readily observed during the process of dialing, leaving the hands free. The withdrawal of the slidable elements, or their restoration to a position under the telephone instrument, is accomplished respectfully by a sustained forward pull or backward push of the fingers, exerted at the angularly bent portion at the forward end 3 of slide member 2. With the slidable elements withdrawn the indexed sheets can be readily slipped from their resting place and revised or renewed, and replaced as required.

Improvements in the presently described invention over the original telephone index as described in Patent 2,741,-860 are as follows:

(1) The improved device can be attached to the telephone instrument, such attachment presenting no violation of telephone company regulations pertaining to foreign attachments to its rented equipment.

(2) The improved device can be effectively used with modern types of rectangular based cradle handset telephones of various lengths.

(3) The improved device can be quickly assembled with all parts interlocked, eliminating the need for adhesives, clips, fasteners, and hardware of any kind.

(4) The improved device permits the ready removal and replacement of the unattached listing sheets.

Having thus described my invention, what I claim as new and desire to secure by United States Letters Patent is:

1. In a telephone number index of the character described for use with telephone stands having four downwardly projecting, rectangularly and variously spaced supporting feet, a frame member and an elastic cord, said frame member having a pair of indentations positioned at opposite corners in the vicinity of its forward end, and having further a pair of slots centrally disposed on opposite sides thereof, the said slots being of a width less than the normal diameter of the said elastic cord, compelling a forced fit of the said elastic cord in the said slots so that it is firmly gripped therein, yet is susceptible to being stretched, attenuated, and manipulated to lengthen or shorten that portion extending between the said slots, and whereby the said elastic cord stretched around the rear supporting feet of any one of said telephone stands is adjustable as to length to coact with said indentations at the forward corners of said frame member, the said indentations gripping the forward supporting feet of a said telephone stand, thus holding said frame member and its related components securely attached, against elastic tension, to the underside of a said telephone stand.

2. In a telephone number index of the character described for use with telephone stands having four downwardly projecting, rectangularly and variously spaced supporting feet, a frame member and a generally flat slide member, the said frame member having a transverse slot at its forward end and a centrally disposed longitudinal slot, the said slide member being of a width to rest loosely in the said transverse slot and having at its rear longitudinal end a pair of laterally projecting and elevated tongues lightly engaging and extending over the edges of the said longitudinal slot in said frame member, the said projecting tongues guiding said slide member in its backward and forward movement through said transverse slot in the forward end of said frame member, this member being of plastic material that can be flexed to distend said longitudinal slot to permit the insertion of said projecting tongues for loosely interlocking said frame and slide member.

3. In a telephone number index of the character described for use with telephone stands having four downwardly projecting, rectangularly and variously spaced supporting feet, a frame member having longitudinal and transverse slots, and a generally flat rectangular slide member, said slide member having at its forward longitudinal end a raised bent portion and at its rear longitudinal end a pair of laterally projecting and elevated tongues, and being designed to support indexed material consisting of a complement of alphabetically indexed sheets securely held against shifting longitudinally from their resting place on said slide member by contact with said raised bent portion and by contact with said projecting tongues where they join said slide member, and held against lateral shifting by the edges of said transverse slot in said frame member.

4. In a telephone number index of the character described for use with telephone stands having four downwardly projecting, rectangularly and variously spaced supporting feet, a frame member, an elastic cord, a generally flat and rectangular slide member, and indexed material, said frame member having a pair of indentations positioned at opposite corners in the vicinity of its forward end, a centrally disposed longitudinal slot, and a transverse slot at its forward end, and having further a pair of slots centrally disposed on opposite sides thereof, the said slots being of a width less than the normal diameter of the said elastic cord, compelling a forced fit of the said elastic cord in the said slots so that it is firmly gripped therein, yet is susceptible to being stretched, attenuated, and manipulated to lengthen or shorten that portion extending between the said slots, and whereby the said elastic cord stretched around the rear supporting feet of any one of said telephone stands is adjustable as to length to coact with said indentations at the forward corners of said frame member, the said indentations gripping the forward supporting feet of a said telephone stand, thus holding said frame member and its related components securely attached, against elastic tension, to the underside of a said telephone stand, the said slide member having at its forward longitudinal end a raised bent portion and at its rear longitudinal end a pair of laterally projecting and elevated tongues, said slide member being of a width to rest loosely in the said transverse slot of the said frame member with the said projecting tongues of said slide member lightly engaging and extending over the edges of the said longitudinal slot in said frame member, the said projecting tongues guiding said slide member in its backward and forward movement through said transverse slot in said frame member, this member being of plastic material that can be flexed to distend said longitudinal slot to permit the insertion of said projecting tongues for loosely interlocking said frame and slide member, the said slide member being designed to support said indexed material consisting of a complement of alphabetically indexed sheets securely held against shifting longitudinally from their resting place on said slide member by contact with said raised bent portion and by contact with said projecting tongues where they join said slide member, and held against lateral shifting by the edges of said transverse slot in said frame member.

References Cited in the file of this patent

UNITED STATES PATENTS

| | | |
|---|---|---|
| 2,201,139 | Ivey | May 21, 1940 |
| 2,203,155 | Julien et al. | June 4, 1940 |
| 2,471,430 | Higbee | May 31, 1949 |
| 2,741,860 | Van Gieson | Apr. 17, 1956 |